United States Patent [19]

Hoban et al.

[11] Patent Number: 5,569,841
[45] Date of Patent: Oct. 29, 1996

[54] CYLINDER COMBUSTION GAS LEAKAGE TESTING

[75] Inventors: Patrick J. Hoban; Michael C. Plaza, both of North Platte, Nebr.

[73] Assignee: General Electric Company, Erie, Pa.

[21] Appl. No.: 354,986

[22] Filed: Dec. 13, 1994

[51] Int. Cl.[6] .................................................. G01M 15/00
[52] U.S. Cl. ...................................... 73/47; 73/115
[58] Field of Search ............................ 73/47, 120, 115, 73/40

[56] References Cited

U.S. PATENT DOCUMENTS

| | | | |
|---|---|---|---|
| 1,426,711 | 8/1922 | Butter | 73/47 |
| 1,451,386 | 4/1923 | Brooks | 73/47 |
| 1,464,817 | 8/1923 | Hammett | 73/47 |
| 2,084,683 | 6/1937 | Hewitt | 73/47 |
| 2,212,466 | 8/1940 | Bradford | 73/47 |
| 2,328,289 | 8/1943 | Morgan et al. | 73/47 |
| 2,352,350 | 6/1944 | Smith | 73/47 |
| 2,625,033 | 1/1953 | Adair | 73/47 |
| 2,811,852 | 11/1957 | Shuck et al. | 73/47 |
| 2,823,542 | 2/1958 | Walraven et al. | 73/47 |
| 2,862,386 | 12/1958 | Campbell et al. | 73/47 |
| 3,039,300 | 6/1962 | Phillips et al. | 73/47 |
| 3,093,596 | 6/1963 | Cone | 73/47 |
| 3,320,801 | 5/1967 | Rhindress | 73/47 |
| 3,834,220 | 9/1974 | Westmoreland | 73/47 |
| 4,574,620 | 3/1986 | Cohl | 73/47 |
| 4,633,707 | 1/1987 | Haddox | 73/47 |
| 5,365,773 | 11/1994 | Graze et al. | 73/47 |

FOREIGN PATENT DOCUMENTS

| | | | |
|---|---|---|---|
| 0713046 | 10/1931 | France | 73/47 |
| 1939854 | 2/1970 | Germany | 73/47 |
| 0236077 | 1/1969 | U.S.S.R. | 73/47 |

*Primary Examiner*—Richard Chilcot
*Assistant Examiner*—George M. Dombroske
*Attorney, Agent, or Firm*—Marvin Snyder

[57] ABSTRACT

A leakage tester for identifying defective piston assemblies in a diesel engine includes an adapter fitting for connection to a compression relief valve port on a selected diesel engine cylinder, a fixed length of air conduit having a preselected inside diameter connected at one end to the adapter fitting, and an orifice meter having an air inlet and an air outlet. The orifice meter includes first and second pressure gauges for measuring air inlet pressure and air outlet pressure, respectively, the air conduit having another end connected to the air outlet. In use, the tester is connected to the compression relief valve port and the air inlet of the orifice meter is connected to a source of pressurized air. With the engine advanced to position the piston in the selected cylinder at top dead center, a preselected pressure is applied to the orifice meter. Cylinder leakage is then determined directly from the pressure reading on the second pressure gauge. A pressure regulator coupled between the source of pressurized air and the air inlet on the orifice meter maintains a preselected pressure at the air inlet.

3 Claims, 2 Drawing Sheets

CYLINDER COMBUSTION GAS LEAKAGE TESTING

BACKGROUND OF THE INVENTION

This invention relates to diesel engine testing and, more particularly, to a method and apparatus for testing for combustion gas leakage caused by broken or cracked pistons or damaged piston rings.

Diesel engines for use in high horsepower applications such as, for example, diesel electric propulsion systems for locomotives or ocean-going ships, are heavy duty units with few user serviceable components. The cylinders of such engines often include a steel liner welded to a steel head. Since major disassembly is required to open such a cylinder for inspection, it is desirable to provide test equipment that can detect a failure mode within a cylinder without such disassembly.

One exemplary failure in diesel engine cylinders results from combustion gas leakage from the cylinder into the engine crankcase. Not only does such leakage detrimentally affect engine efficiency but it also undesirably pressurizes the engine crankcase. While compression testing is often used for detecting cylinder leakage, such testing can be adversely affected by weak batteries and engine temperature, and some leakage problems can be masked by compression testing. Further, compression testing is time consuming compared to leakage testing. One method of leakage detection has been to pressurize a cylinder with air and then observe the time required for the pressure to drop to some preselected low value. This prior method generally uses "shop air" which may be at varying pressure, and relies more on "feel" rather than precise measurement. For example, shop personnel generally count off a number of seconds rather than use a timer to accurately measure time duration. However, since air pressure is a variable, some variation in the measured time duration has been acceptable. In general, this prior method will identify gross failures while slow leaks that may result from an incipient failure mode will be missed. Accordingly, it is desirable to provide a method and apparatus for more accurately measuring cylinder leakage for identifying piston and piston ring failures.

SUMMARY OF THE INVENTION

One object of the invention is to provide an improved method and apparatus for determining combustion gas leakage within a diesel engine cylinder.

Another object of the invention is to provide a method and apparatus for establishing a quantitative measurement of combustion gas leakage within a diesel engine cylinder.

Briefly, in accordance with an illustrative form of the invention, a leakage tester for identifying defective piston assemblies in a diesel engine comprises apparatus for supplying air at a regulated pressure into a diesel engine cylinder and for providing a measured rate of air leakage within the cylinder. The apparatus includes an orifice meter with a first pressure gauge on the inlet of the orifice meter for measuring the pressure applied to the orifice and a second pressure gauge on an outlet of the orifice meter for providing an indication of the pressure in the cylinder. For a cylinder with absolutely zero leakage, the outlet air pressure will equal the inlet air pressure. As the amount of leakage increases, the outlet air pressure drops and provides a quantitative indication of the degree of leakage. The apparatus also includes an adapter fitting for connection to a valve adapter on the diesel engine cylinder to allow air to be injected into the cylinder when the piston is in a top dead center position. A fixed length of air conduit or hose having a preselected inside diameter connects the orifice meter to the valve adapter. In a preferred embodiment, a pressure regulator is attached to the air inlet end of the orifice meter to enable the inlet pressure to be set at a preselected value such as, for example, 80 psi (pounds per square inch).

In system operation, a preselected air pressure is applied to a diesel engine cylinder with the piston within the cylinder advanced to top dead center of a compression stroke. The pressure regulator is adjusted to establish a preselected pressure on the inlet end of the orifice meter and the pressure on the outlet end of the orifice meter is read from a second pressure gauge. The amount by which the pressure on the outlet side of the orifice meter drops below 80 psi is a quantitative indication of the degree of leakage of air about the piston within the cylinder. Based upon known characteristics of the cylinder, a value of outlet pressure can be established above which the cylinder is considered to be in good condition and below which the cylinder is considered to have excessive leakage. In one exemplary form, in which the cylinder diameter is approximately nine inches, the outlet pressure is considered to be acceptable if it exceeds 25 psi for an inlet pressure of 80 psi.

BRIEF DESCRIPTION OF THE DRAWINGS

The features of the invention believed to be novel are set forth in the appended claims. The invention, however, together with further objects and advantages thereof, may best be understood by reference to the following description taken in conjunction with the accompanying drawing(s) in which:

DETAILED DESCRIPTION OF THE INVENTION

Figure 1:
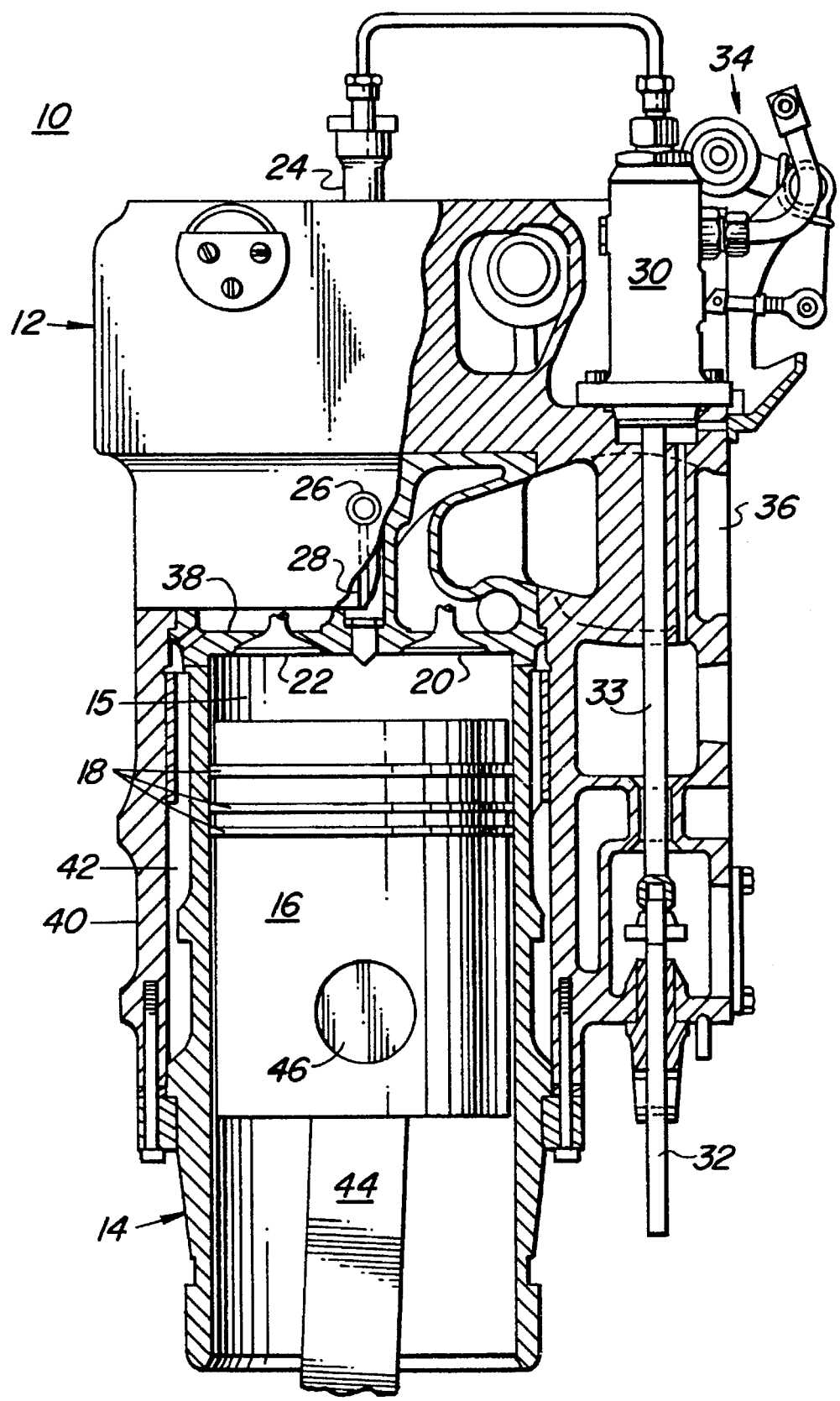
FIG. 1 is a simplified cross-sectional view of a diesel engine cylinder with which the present invention may be used.

FIG. 1 illustrates, in partial cross-sectional view, a single cylinder assembly for a multi-cylinder diesel engine. Cylinder assembly 10 includes a steel cylinder head 12 welded to a steel cylinder liner 14. A reciprocally movable piston 16 is operatively positioned in a cylinder cavity 15 defined by cylinder liner 14. Piston 16 includes a plurality of piston rings 18 which prevent combustion gases from escaping between the sides of the piston and the inside surface of the liner. In an exemplary embodiment, cylinder 10 operates in a four-cycle mode and includes intake valves 20 and exhaust valves 22 seated in respective intake and exhaust ports at the top of cylinder 10. A fuel injector 24, located at the top of the cylinder head and between the valves, injects fuel into the cylinder. A compression relief valve port 26 is drilled or otherwise formed in cylinder head 12. This port may be opened when it is desired to manually rotate the engine or to crank the engine without compression. A fitting (not shown) is normally threaded into port 26 to block or close the port. A second port or hole 28, drilled into cylinder head 12, extends from the top of cylinder cavity 15 upward until it intersects with port 26. When the fitting is removed from port 26, a passage is formed through ports 26 and 28 to vent gas from, or admit gas into, cylinder cavity 15. Assembly 10 also includes a fuel injection pump 30 coupled to a fuel pump tappet rod 32 via a push rod 33. A fuel linkage assembly 34 is connected to pump 30. An air inlet opening 36 admits air to intake valves 20 while an exhaust passage 38 through head 12 provides an exhaust outlet for valves 22. A cylinder jacket 40 girds cylinder liner 14 and defines a cooling water space 42 between liner 14 and jacket 40. Piston 16 is coupled to a drive shaft (not shown) via piston arm 44 pinned at 46 to the piston.

In the past, it has been general practice to perform leakage testing by first pressurizing the cylinder space above the piston and then quantitatively evaluating piston leakage by determining the rate at which the pressure drops after the portion of the cylinder above the piston is pressurized. In these procedures, shop air is normally applied to the cylinder cavity space above piston 16 through a coupler (not shown) threaded into port 26 and monitored with a pressure gauge (not shown). When the shop air is turned off, the air in the cylinder cavity 15 above piston 16 bleeds off through any leaks in the cavity or piston and the reduction in pressure can be observed on the pressure gauge. Typically, a time interval of a few seconds, such as for example, five seconds, is measured, and if the pressure has dropped below a selected level at the end of that time interval, it is assumed that the piston or cylinder has excessive leakage. The difficulty with this procedure is that the shop air pressure varies and the timing is not normally closely monitored, i.e., the mechanic usually counts a number of seconds instead of measuring the interval accurately with a watch or timer.

Figure 2:
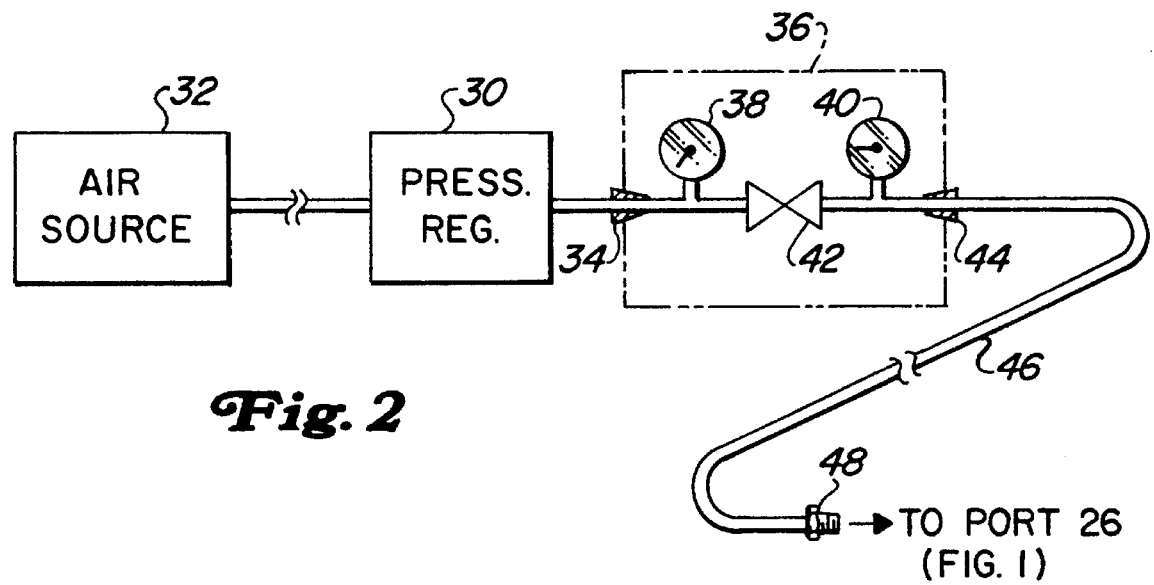
FIG. 2 is a simplified schematic representation of a leakage indicator in accordance with the present invention.

FIG. 2 illustrates one form of an improved leakage tester in accordance with the invention. The leakage tester includes a pressure regulator 30 which is adapted to be connected to an air source 32 such as a compressor. Pressure regulator 30 couples air at a regulated pressure to an inlet 34 of an orifice meter 36. Orifice meter 36 includes an inlet pressure gauge 38 and an outlet pressure gauge 40. Between pressure gauges 38 and 40 is an orifice 42 having a preselected opening, such as, for example, 0.0625 inches in diameter. Orifice meter 36 includes an outlet 44 to which is connected a length of air conduit or air hose 46 of preselected diameter and length. Air hose 46 terminates in a threaded fitting 48 adapted to engage compression relief port 26 in cylinder 10 (FIG. 1).

Figure 3:
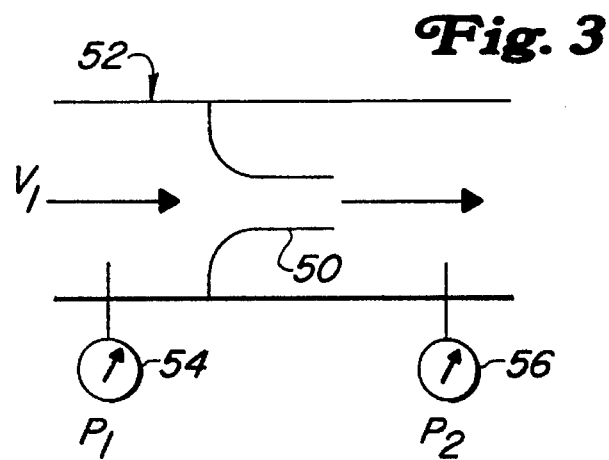
FIG. 3 illustrates a theory of operation of the present invention.

To better understand operation of the apparatus of FIG. 2, reference is made to FIG. 3 which shows, in schematic form, an orifice 50 positioned within a conduit 52 through which a fluid flow rate is to be determined. A meter 54 measures pressure upstream of the orifice while a meter 56 measures pressure downstream of the orifice. For such system, it can be shown that the volume rate of flow Q is given by the expression:

$$Q = KA_2 \frac{\sqrt{2g(P_1 - P_2)}}{W} \quad (1)$$

where K is a flow coefficient given by the expression:

$$K = \frac{C}{\sqrt{1 - \left(\frac{A_2}{A_1}\right)^2}} \quad (2)$$

In equations (1) and (2) above, $A_1$ represents the cross-sectional area upstream of the orifice, $A_2$ is the cross-sectional area within the orifice, W is the specific weight of the fluid in the flow pipe, C is a dimensionless discharge coefficient often determined experimentally, and G is the gravitational acceleration constant.

The above equations are well known and are generally derived from the Hagen Poiseuille Law. Accordingly, it is apparent that the flow rate of fluid through conduit 52 can be determined by measuring pressure upstream and downstream of orifice 50. In actuality, since the pressure upstream is regulated, the downstream pressure is directly proportional to the volume rate of flow. As noted, the discharge coefficient C affects the flow rate and thus also affects the readings on the downstream pressure gauge. Accordingly, for any given system as shown in FIG. 2, the length and diameter of connection hose 46 must remain constant independent of pressure therein in order for pressure gauge 40 to provide an accurate representation of the leakage rate of a cylinder connected to the system. In practice, the value of the coefficient C can be determined by connection of a container of known volume and leak rate to fitting 48 and then computing C using the equation for volume rate of flow in a reverse form.

In using the improved testing apparatus of FIG. 2, the piston within cylinder 10 (FIG. 1) is first moved into a top dead center position so that air pressure applied to the cylinder will not cause the piston to move. The pressure relief valve fitting is removed to expose the pressure relief valve port 26 and allow threaded fitting 48 to be screwed into port 26. Air source 32 is connected to pressure regulator 30 and the pressure regulator is adjusted to set the pressure on gauge 38 to a preselected value such as, for example, 80 psi. The reading on downstream gauge 40 is then obtained to provide a direct correlation with the leakage rate of the cylinder due to gases leaking around the piston rings or through cracks in the piston. In a preferred form in which the cylinder is approximately nine inches in diameter, the air conduit or hose 46 is selected to be a 50 inch length of ½ inch hose, the orifice diameter is 0.0625 inches and the pressure at meter gauge 38 is set for 80 psi, a pressure reading at meter gauge 40 of greater than 25 psi is indicative of an acceptable rate of air leakage within the cylinder while a pressure of less than 25 psi indicates a damaged cylinder typically caused either by a cracked piston or damaged or broken piston rings. While it is possible to calculate an acceptable leakage rate from engine design data (some amount of air leakage around the intake and exhaust valves and by the piston rings is permitted), a preferred method is to establish an acceptable rate from empirical testing of several cylinders. The value of 25 psi given above for the illustrative design was derived from such empirical testing.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A method for determining combustion gas leakage in a diesel engine cylinder having a piston reciprocally movable therein, the cylinder including a compression relief adapter port, the method comprising the steps of:

advancing the piston to substantially top dead center on a compression stroke;

connecting one end of a selected length of air hose to the compression relief adapter port;

connecting another end of the air hose to an orifice meter, the meter having a first pressure gauge for measuring inlet air pressure to the meter, an inlet air pressure regulator, and a second pressure gauge for measuring outlet air pressure to the cylinder supplied through the air hose;

supplying a flow of air to the orifice meter;

adjusting the regulator to establish a preselected inlet air pressure at the first pressure gauge; and reading the outlet air pressure on the second pressure gauge to determine the leakage rate of the cylinder.

2. The method of claim 1 including the step of maintaining the air hose at a constant diameter and constant selected length independent of pressure in the air hose.

3. The method of claim 2 wherein the preselected inlet air pressure is maintained constant at its preselected level.

* * * * *

UNITED STATES PATENT AND TRADEMARK OFFICE
CERTIFICATE OF CORRECTION

PATENT NO. : 5,569,841
DATED : October 29, 1996
INVENTOR(S) : Patrick J. Hoban; Michael C. Plaza It is certified that error appears in the above-identified patent and that said Letters Patent is hereby corrected as shown below:

<u>Column 5,</u>
Cancel the last two lines and substitute --adjusting the regulator so as to establish, at the first pressure gauge, a preset inlet air pressure depending upon the displacement volume of the cylinder; and--.

Signed and Sealed this

Third Day of July, 2001

*Attest:*

*Attesting Officer*

NICHOLAS P. GODICI
*Acting Director of the United States Patent and Trademark Office*